(12) United States Patent
Lee et al.

(10) Patent No.: US 10,509,744 B2
(45) Date of Patent: Dec. 17, 2019

(54) SEMICONDUCTOR SYSTEM INCLUDING HETEROGENEOUS MEMORY MODULE

(71) Applicant: SAMSUNG ELECTRONICS CO., LTD., Suwon-si, Gyeonggi-do (KR)

(72) Inventors: Jeong Ho Lee, Gwacheon-si (KR); Sung Roh Yoon, Seoul (KR); Eui Young Chung, Seongnam-si (KR); Jin Woo Kim, Seoul (KR); Young Jin Cho, Seoul (KR); Myeong Jin Kim, Seoul (KR); Sei Joon Kim, Seongnam-si (KR); Jeong Bin Kim, Seoul (KR); Hyeok Jun Choe, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 26 days.

(21) Appl. No.: 15/844,165

(22) Filed: Dec. 15, 2017

(65) Prior Publication Data
US 2018/0189206 A1    Jul. 5, 2018

(30) Foreign Application Priority Data
Dec. 30, 2016 (KR) .................. 10-2016-0183311

(51) Int. Cl.
*G06F 13/16* (2006.01)
*G06F 13/28* (2006.01)

(52) U.S. Cl.
CPC ......... *G06F 13/1684* (2013.01); *G06F 13/28* (2013.01)

(58) Field of Classification Search
CPC .............................. G06F 13/1684; G06F 13/28
USPC .............................................................. 710/308
See application file for complete search history.

(56) References Cited

U.S. PATENT DOCUMENTS

| | | | |
|---|---|---|---|
| 4,849,879 A * | 7/1989 | Chinnaswamy | G06F 11/34 706/45 |
| 7,571,295 B2 | 8/2009 | Sakarda et al. | |
| 7,716,411 B2 | 5/2010 | Panabaker et al. | |
| 8,397,013 B1 * | 3/2013 | Rosenband | G06F 13/385 365/205 |
| 8,825,984 B1 * | 9/2014 | Srinivasan | G06F 12/1009 711/206 |
| 8,938,601 B2 | 1/2015 | Lee et al. | |
| 9,128,845 B2 | 9/2015 | Chang et al. | |
| 9,158,684 B2 * | 10/2015 | Lee | G06F 12/0246 |
| 10,198,350 B2 * | 2/2019 | Lee | G06F 12/08 |
| 2009/0222620 A1 * | 9/2009 | Kanai | G06F 1/3225 711/104 |
| 2010/0011188 A1 * | 1/2010 | Eddy | G06F 9/383 711/207 |

(Continued)

*Primary Examiner* — Paul R. Myers
(74) *Attorney, Agent, or Firm* — Volentine, Whitt & Francos, PLLC

(57) ABSTRACT

A semiconductor system includes a CPU connected to a heterogeneous memory module via a system bus. The heterogeneous memory module includes; a volatile memory module, a nonvolatile memory module, an internal bus separate from the system bus and connecting the volatile memory module and the nonvolatile memory module, and a swap manager configured to control execution of a swap operation transferring target data between the volatile memory module and nonvolatile memory module using the internal bus and without using of the system bus.

20 Claims, 12 Drawing Sheets

(56) References Cited

U.S. PATENT DOCUMENTS

| | | | |
|---|---|---|---|
| 2012/0137055 A1* | 5/2012 | Lee | G06F 12/0223 711/103 |
| 2012/0151119 A1* | 6/2012 | Yoshida | G06F 12/0638 711/102 |
| 2013/0254511 A1* | 9/2013 | Das Purkayastha | G06F 12/023 711/170 |
| 2015/0003175 A1* | 1/2015 | Ramanujan | G11C 14/0009 365/189.17 |
| 2015/0074339 A1* | 3/2015 | Cheriton | G06F 12/0804 711/103 |
| 2015/0261616 A1* | 9/2015 | Lim | G06F 11/1446 710/308 |
| 2015/0278104 A1 | 10/2015 | Moon et al. | |
| 2015/0355846 A1* | 12/2015 | Uematsu | G11C 5/04 711/103 |
| 2016/0034405 A1 | 2/2016 | Kwon et al. | |
| 2016/0125919 A1 | 5/2016 | Hush | |
| 2018/0024750 A1* | 1/2018 | Hassan | G06F 3/064 711/105 |
| 2018/0107596 A1* | 4/2018 | Kelly | G06F 12/0804 |
| 2018/0150219 A1* | 5/2018 | Chen | G06F 3/061 |

\* cited by examiner

SEMICONDUCTOR SYSTEM INCLUDING HETEROGENEOUS MEMORY MODULE

CROSS-REFERENCE TO RELATED APPLICATION

This application claims priority from Korean Patent Application No. 10-2016-0183311 filed on Dec. 30, 2016 under 35 U.S.C. 119, the subject matter of which is incorporated by reference.

BACKGROUND

The inventive concept relates generally to semiconductor systems. More particularly the inventive concept relates to semiconductor systems including a heterogeneous memory module capable of transferring data between internally disposed memory resources without occupying resources (e.g., system bus(es) and processing components) external to the heterogeneous memory module.

A heterogeneous memory module includes two or more different types of memory modules. For example, a heterogeneous memory module may include a dynamic random access memory (DRAM) which corresponds to a memory for storing data in a volatile memory cell, and a NAND flash-based storage device (NFSD) which corresponds to a memory for storing data in a nonvolatile memory cell.

There is a need to perform data swap operations between the DRAM and the NFSD. For example, if a page fault occurs in the DRAM, it is necessary to perform a swap-in operation for transferring data stored in the NFSD to the DRAM. If the memory of the DRAM is exceeded, it is necessary to perform a swap-out operation for transferring data from the DRAM to the NFSD to secure more storage space.

Therefore, there is a demand for a method of efficiently performing data swap operations in a semiconductor system including a heterogeneous memory module.

SUMMARY

In one aspect, the inventive concept provides a semiconductor system including a central processing unit (CPU) connected to a heterogeneous memory module via a system bus. The heterogeneous memory module includes; a volatile memory module, a nonvolatile memory module, an internal bus separate from the system bus and connecting the volatile memory module and the nonvolatile memory module, and a swap manager configured to control execution of a swap operation transferring target data between the volatile memory module and nonvolatile memory module using the internal bus and without using of the system bus.

In another aspect, the inventive concept provides a semiconductor system including; a central processing unit (CPU) connected to a heterogeneous memory module via a system bus. The heterogeneous memory module includes; a volatile memory module, a page table describing the data store din the volatile memory module, a nonvolatile memory module, an internal bus separate from the system bus and connecting the volatile memory module and the nonvolatile memory module and a memory controller. The memory controller includes; a target selector that selects target data stored in one of the volatile memory module and the nonvolatile memory module according to an access pattern derived from the page table, an algorithm module that provides an algorithm, and a swap manager configured in response to the algorithm to control execution of a swap operation transferring the target data selected by the target selector between the volatile memory module and nonvolatile memory module using the internal bus and without using of the system bus.

In another aspect, the inventive concept provides a method of controlling the operation of a semiconductor system including a central processing unit (CPU) connected to a heterogeneous memory module via a system bus. The heterogeneous memory module includes a volatile memory module, a nonvolatile memory module, an internal bus separate from the system bus and connecting the volatile memory module and the nonvolatile memory module, and a swap manager. The method includes; in response to an instruction received in the heterogeneous memory module from the CPU via the external bus, configuring the swap manager to control the execution of a swap operation transferring target data between the volatile memory module and nonvolatile memory module using the internal bus and without using of the system bus.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Figure 1:
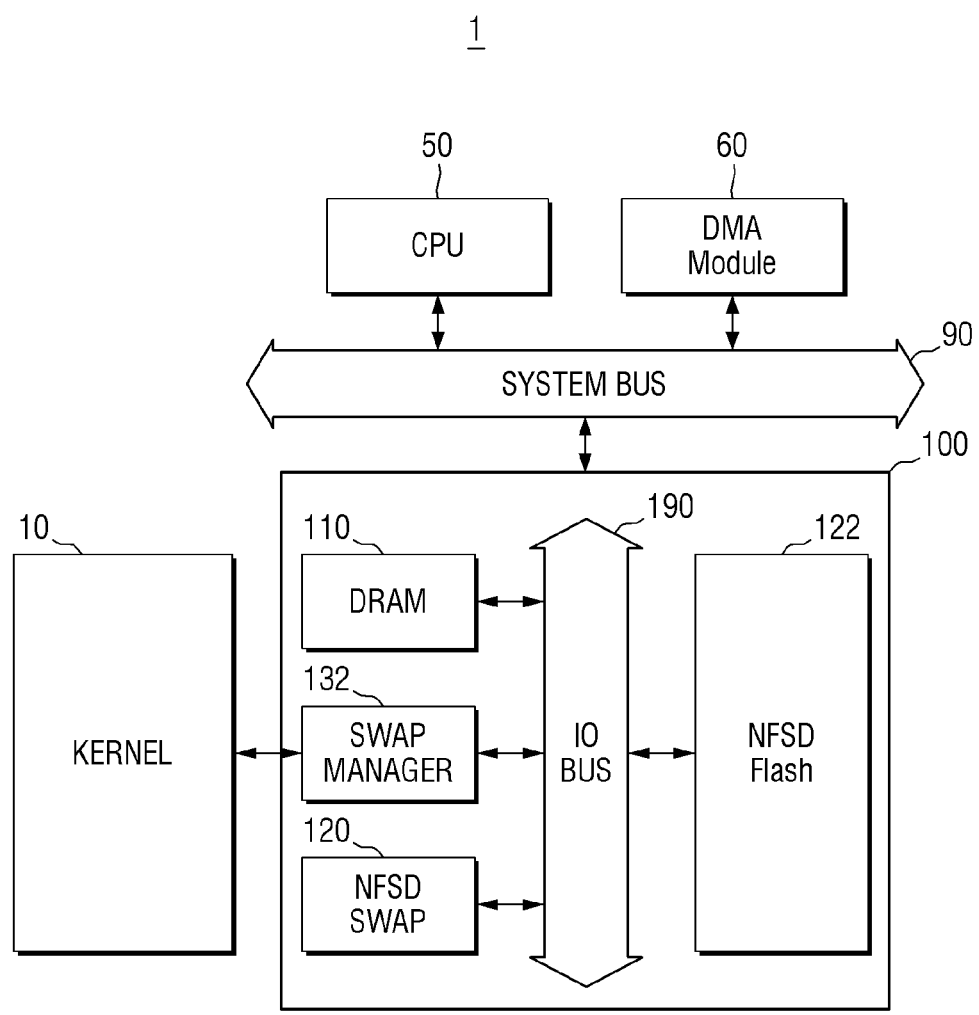
FIG. 1 is a block diagram illustrating a semiconductor system according to an embodiment of the present disclosure.

FIG. 1 is a block diagram illustrating a semiconductor system 1 according to an embodiment of the inventive concept. The semiconductor system 1 comprises a kernel 10, a central processing unit (CPU) 50, a direct memory access (DMA) module 60 and a heterogeneous memory module 100. The CPU 50, DMA module 60, and heterogeneous memory module 100 are electrically interconnected via a system bus 90. Here, the semiconductor system 1 may be used in an electronic device or computational platform, such as a personal computer, laptop, tablet computer, smartphone, etc.

In FIG. 1, the kernel 10 may include the hardware and/or software (hereafter, singularly or collectively, "hardware/software") resources that implement an operating system, such as an operating system driving a Linux® compatible semiconductor system. In this regard, kernel 10 may include one or more hardware/software resources that process commands, instructions and/or data associated with a memory read and/or write (hereafter, read/write) operation requested by a user of a device incorporating the semiconductor system 1 or an application driving the heterogeneous memory module 100. The DMA module 60 may be used to control the transfer of data between one or more peripheral devices (external to the semiconductor system 1) and CPU 50.

In certain embodiments, heterogeneous memory module 100 includes one or more first type memory module(s), one or more second type memory module(s), and a swap manager 132.

A first type memory module is one wherein data is principally stored in volatile memory, such as a dynamic random access memory (DRAM) or similar volatile memory resource, wherein stored data may be lost when applied power is interrupted. Hereafter, a first type memory module (e.g., DRAM 110 in FIG. 1) will be referred to as a "volatile memory module" regardless of the specific type and/or configuration of volatile memory cells.

A second type memory module is one wherein data is principally stored in nonvolatile memory, such as flash memory or similar nonvolatile memory resource, wherein stored data is retained when applied power is interrupted. Hereafter, a second type memory module (e.g., NAND flash-based storage devices (NFSD) 120 and 122 in FIG. 1) will be referred to as a "nonvolatile memory module" regardless of the specific type and/or configuration of nonvolatile memory cells.

In the illustrated example of FIG. 1, the NFSD memory 120 and the NFSD Swap memory 122 provide separate and distinct (first and second) nonvolatile storage areas. Here, the first nonvolatile storage area 120 includes a swap data area used to temporarily store "swap data" provided by (or provided under the control of) the swap manager 132 (e.g., during a swap data operation). Conversely, the second nonvolatile storage area 122 is used to store data, other than the swap data.

The swap manager 132 is connected via an internal bus 190 to the volatile memory module(s) (e.g., DRAM 110) and nonvolatile memory module(s) (e.g., NFSD 122 and NFSD Swap 120) such that data may be directly exchanged between the volatile and nonvolatile memory modules. In this regard, the internal bus may be understood as being "separate from" the system bus 90 in an operational context. That is while the system bus 90 and internal bus 190 may be cooperatively used, wholly or in part, to transfer data between the heterogeneous memory module 100 and an external resource (e.g., CPU 50 and/or DMA module 60), the internal bus 190 may also be used to separately transfer data between internal components of the heterogeneous memory module 100 without loading (or utilizing) the system bus 90. In additional regard to the foregoing, the term "directly" refers to an exchange or transfer of data fully internal to the heterogeneous memory module 100 and without use of the externally provided system bus 90 or the DMA module 60. In certain embodiments, the swap manager 132 may be fully implemented in hardware within the heterogeneous memory module 100.

With reference to the exemplary configuration illustrated in FIG. 1, the swap manager 132 may directly perform data swap(s) between volatile memory module(s) (e.g., DRAM 110) and nonvolatile memory module(s) (e.g., NFSD 122 and NFSD Swap 120) without use of the DMA module 60 external to the heterogeneous memory module 100. Since the swap manager 132 is able to execute swap operations between volatile memory module(s) and nonvolatile memory module(s) without occupying the system bus 90, it is possible reduce the load on data processing resources without extending the time required to perform corresponding data processing operations (e.g., read, write, erase, garbage collection, etc.).

Further, the swap manager 132 may operate, as needed, in an automatic manner within the heterogeneous memory module 100 without demanding (or waiting upon) external resources, such as the system bus 90 and/or DMA module 60. In this regard, the phrase "the swap manager 132 operates automatically" as used hereafter to mean that the swap manager 132 may perform swap operations in response to a request from the kernel 10, or may autonomously (or internally) perform data swap without a request from the kernel 10, without substantial data processing demands upon resources external to the heterogeneous memory module 100. The following cases are illustrative.

For example, the swap manager 132 may receive a swap request from the kernel 10, and perform a swap-in operation that transfers data from a nonvolatile memory module (e.g., NFSD Swap 120 or NFSD 122) in response to the swap request.

Alternately, the swap manager 132 may internally determine to perform a data swap regardless of the control condition of the kernel 10. That is, the swap manager 132 may monitor the state of a volatile memory module (e.g., DRAM 110) and perform a swap-in operation that transfers data from one or more of the nonvolatile memory modules (NFSD Swap 120 and/or NFSD 122) to the volatile memory module in response to the monitoring result. In another approach, the swap manager 132 may monitor one or more volatile memory module(s) and perform a swap-out operation that transfers data from the one or more volatile memory module(s) to one or more nonvolatile memory module(s) in response to the monitoring result.

As described above, since the swap manager 132 is capable of operating automatically regardless of the control state of the kernel 10, the data stored in a volatile memory module (e.g., DRAM 110) may be effectively is managed according to a defined swap policy, thereby preserving performance characteristics of the semiconductor memory system, such as reducing a number of page fault occurrences.

Figure 2:
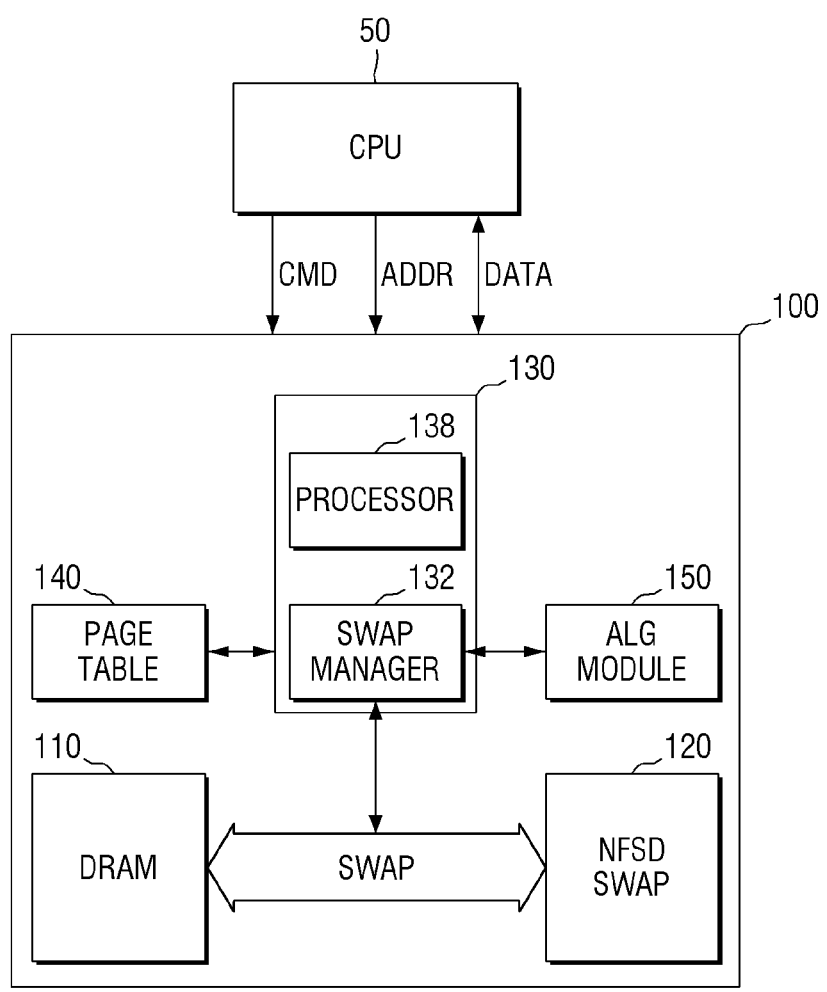
FIG. 2 is a block diagram explaining a semiconductor device constituting the semiconductor system of FIG. 1.

FIG. 2 is a block diagram further illustrating the semiconductor device 10 of FIG. 1. Here, however, the heterogeneous memory module 100 further includes a memory controller 130, a page table (or page map) 140 and an algorithm providing (ALG) module 150 in addition to DRAM 110 and NFSD Swap 120.

The memory controller 130 may be used to implement the swap manager 132 previously described and may further include a processor 138.

The page table 140 is a searchable data structure (e.g., a table) obtained by mapping the memory area provided (e.g.) by DRAM 110. That is, the page table 140 is a searchable data structure describing the data currently stored in the volatile memory module 110. Thus, in response to externally provided memory read/write requests, the page table 140 may be used to indicate whether data identified by a read/writ request validly exists at a correspondingly identified address in DRAM 110.

For example, upon receiving a command (CMD), an address (ADDR) and/or data (DATA) (hereafter, singularly or collectively a "CAD") associated with a memory read/write operation, the heterogeneous memory module 100 may search the page table 140 and determine whether corresponding data to be provided to the CPU 50 is loaded in the memory area provided by a volatile memory module (e.g., DRAM 110). If the page table 140 is searched and a page fault occurs (i.e., valid data is not found in the volatile memory module) it may be necessary to perform a swap-in operation to transfer the identified data (hereafter, "target data") from one or more nonvolatile memory module.

The algorithm providing module 150 may be used to store, update and/or provide an algorithm enabling the swap manager 132 to selectively swap target data stored in a nonvolatile memory module (e.g., NFSD Swap 120). The algorithm may include various cache algorithms such as a least recently used (LRU) algorithm, most recently used (MFU) algorithm, etc.

In this manner, the swap manager 132 may be controlled in its operation to retrieve (or "select") target data to be swapped-in from a nonvolatile memory module 120 using the algorithm stored by the algorithm providing module 150.

Figure 3:
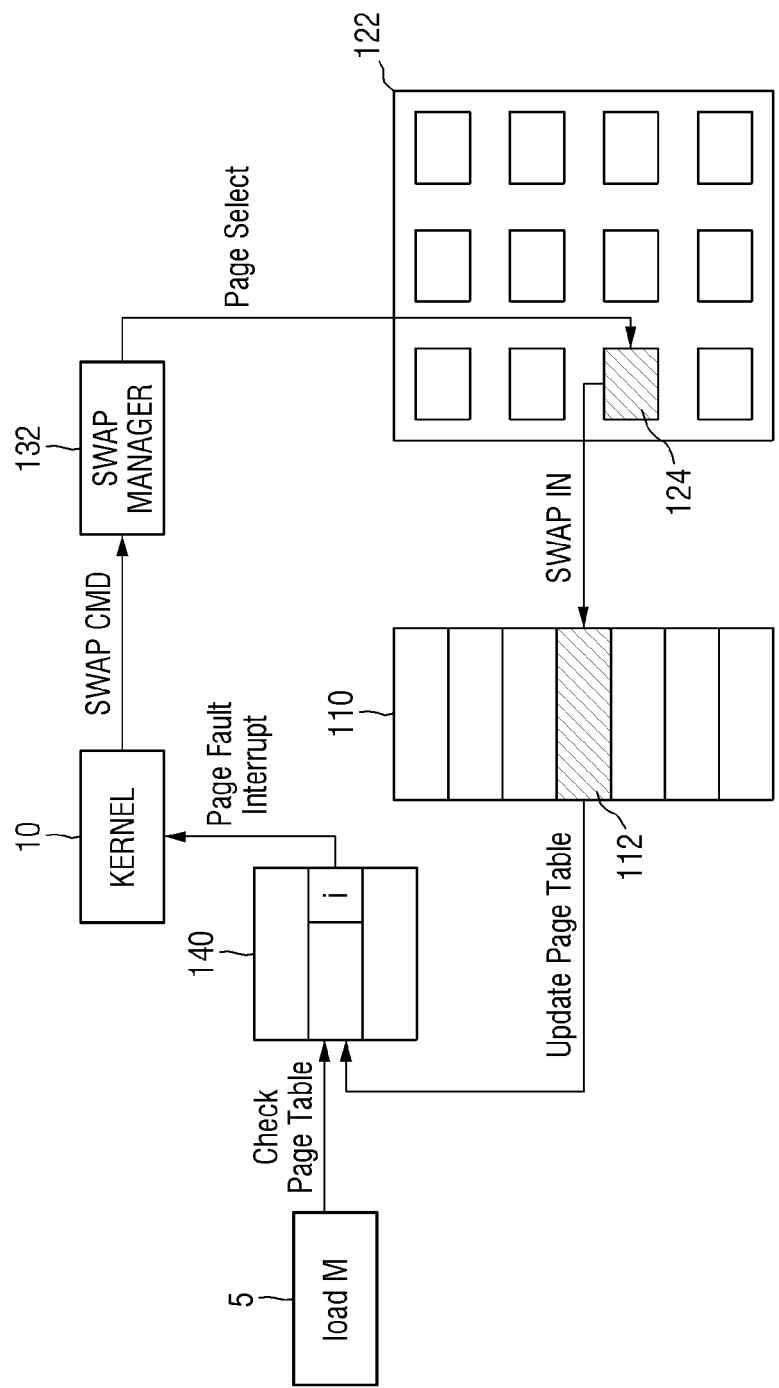
FIG. 3 is a diagram illustrating an embodiment of an operation of the semiconductor device of FIG. 2.

FIG. 3 is a conceptual diagram illustrating an operating approach to the embodiments of FIGS. 1 and 2. In the operation illustrated in FIG. 3, an instruction 5 provided (e.g.) from the CPU 50 includes a command CMD to load data at an address ADDR beginning at an address value of 'M'. In response to the instruction 5, the heterogeneous memory module 100 searches the page table 140. When valid data associated with the command CMD is located at address M, the command may be processed (e.g.) by the memory controller 130 and corresponding results may be returned to the CPU 50.

In contrast, when no valid data to located at address M, a page fault interrupt occurs and the kernel 10 recognizes the occurrence of the page fault interrupt. Accordingly, the kernel 10 communicates a swap command to the swap manager 132, and the swap manager 132 selects target data 124 to be swapped-in from the nonvolatile memory module (e.g., NFSD 122). Accordingly, the swap manager 132 performs a swap-in operation to transfer the selected target data 124 to a designated area of the volatile memory module (e.g., address M of the DRAM 110) and thereafter updates the page table 140 to reflect the execution of the swap-in operation and update of DRAM 110.

It should be noted here that the swap-in operation executed between the volatile memory module (DRAM 110) and nonvolatile memory module (NFSD 122) is performed under the control of the swap manager 132 without occupying resources external to the heterogeneous memory module 100, such as system bus 90, thereby reducing the computational and operation load on such resources and potentially reducing overall semiconductor system operating time.

Figure 4A:
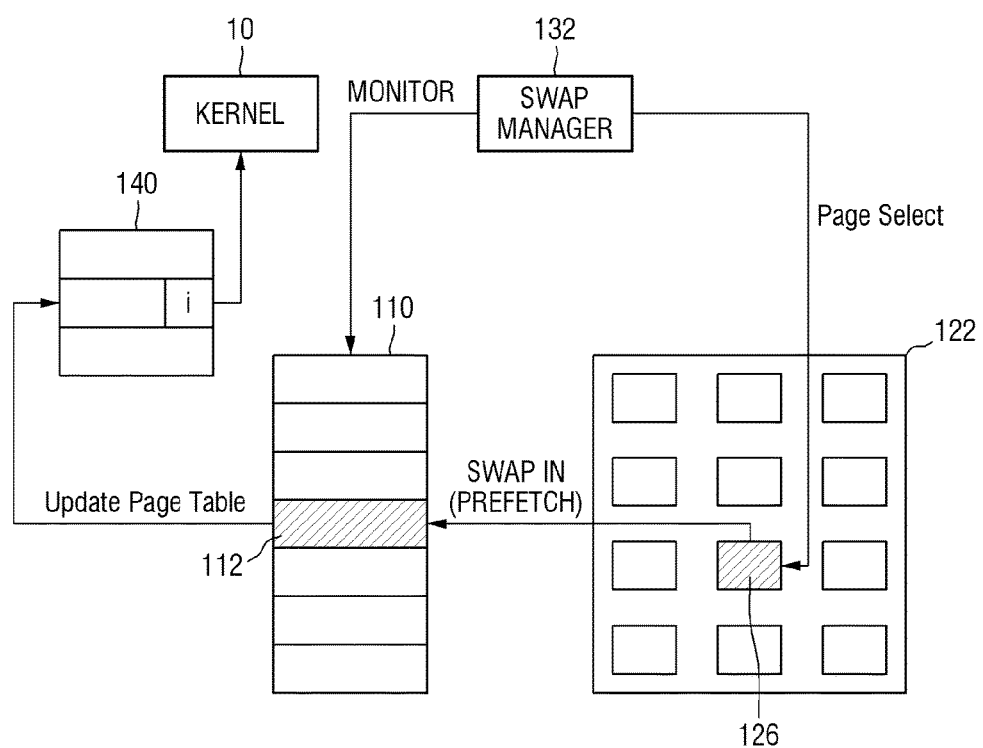
FIG. 4A is a diagram illustrating another embodiment of an operation of the semiconductor device of FIG. 2.

FIG. 4A is a diagram illustrating another approach to the operation of the embodiments of FIGS. 1 and 2.

Referring to FIG. 4A, the swap manager 132 is assumed to automatically perform a swap operation regardless of the control state of the kernel 10 which is external to the heterogeneous memory module 100. That is, unlike the embodiment of FIG. 3, no initiating instruction 5 from CPU 50 is required for the swap manager 132 to perform a swap operation.

For example, the swap manager 132 may monitor the data stored in the volatile memory module 110 in view of a cued sequence of instructions, and determine to perform a swap-in operation that pre-fetches target data 126 from nonvolatile memory module 122 to the volatile memory module according to the monitoring result. Here, the term "pre-fetch" is used to distinguish a swap-in operation that is performed before, and perhaps in anticipation of, a page fault occurring. The page table 140 is also updated in response to execution of the pre-fetch, swap-in operation.

As described above, since the swap manager 132 operates automatically regardless of the control state of the kernel 10, the data stored in the volatile memory module 110 may be more frequently updated (or managed) according to a defined swap policy, thereby achieving performance improvements that reduce the occurrence of page faults.

Figure 4B:
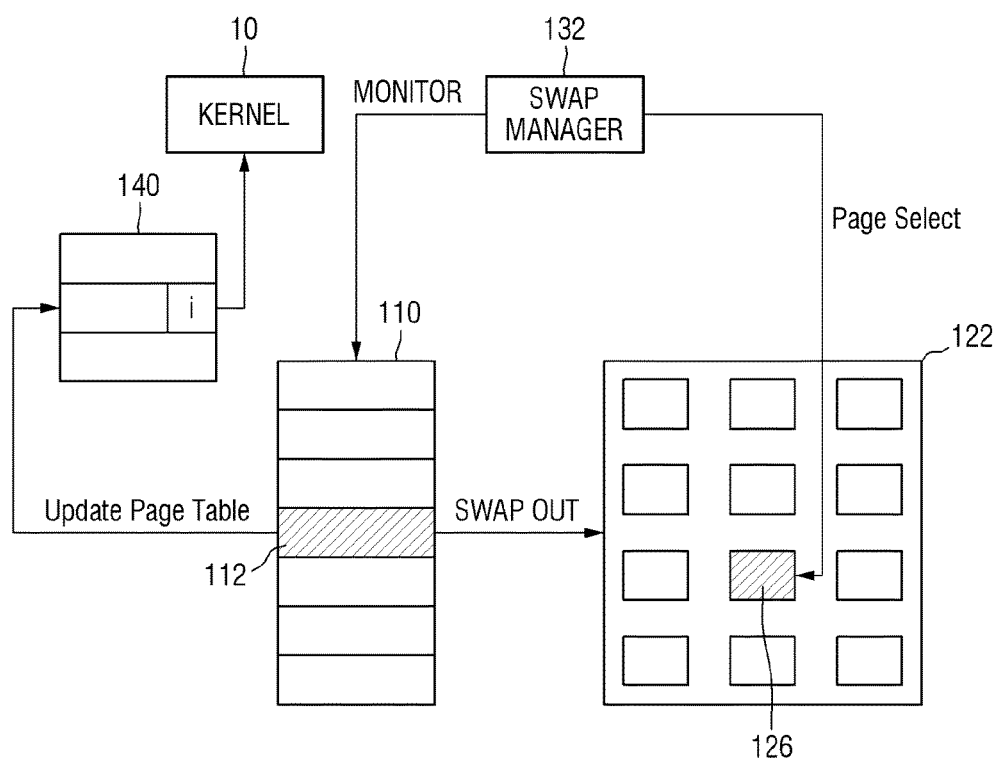
FIG. 4B is a diagram illustrating still another embodiment of an operation of the semiconductor device of FIG. 2.

FIG. 4B is a diagram illustrating still another approach to the operation of the embodiments of FIGS. 1 and 2.

Referring to FIG. 4B, the swap management circuit 132 is here again assumed to automatically perform certain swap operations regardless of the control state of the kernel 10. For example, upon monitoring the volatile memory module 110, the swap manager 132 may determine that it is necessary to perform a swap-out operation that transfers data stored in the volatile memory module 110 to the nonvolatile memory module 122 according to the monitoring result.

In this case, the swap manager 132 selects target data 112 stored in the volatile memory module 110 to be swapped-out to the nonvolatile memory module 122. Thereafter, the page table 140 is updated.

Alternately or additionally, the swap manager 132 may determine to swap out target data initially stored in the nonvolatile memory module 122 to the volatile memory module 110.

Figure 5:
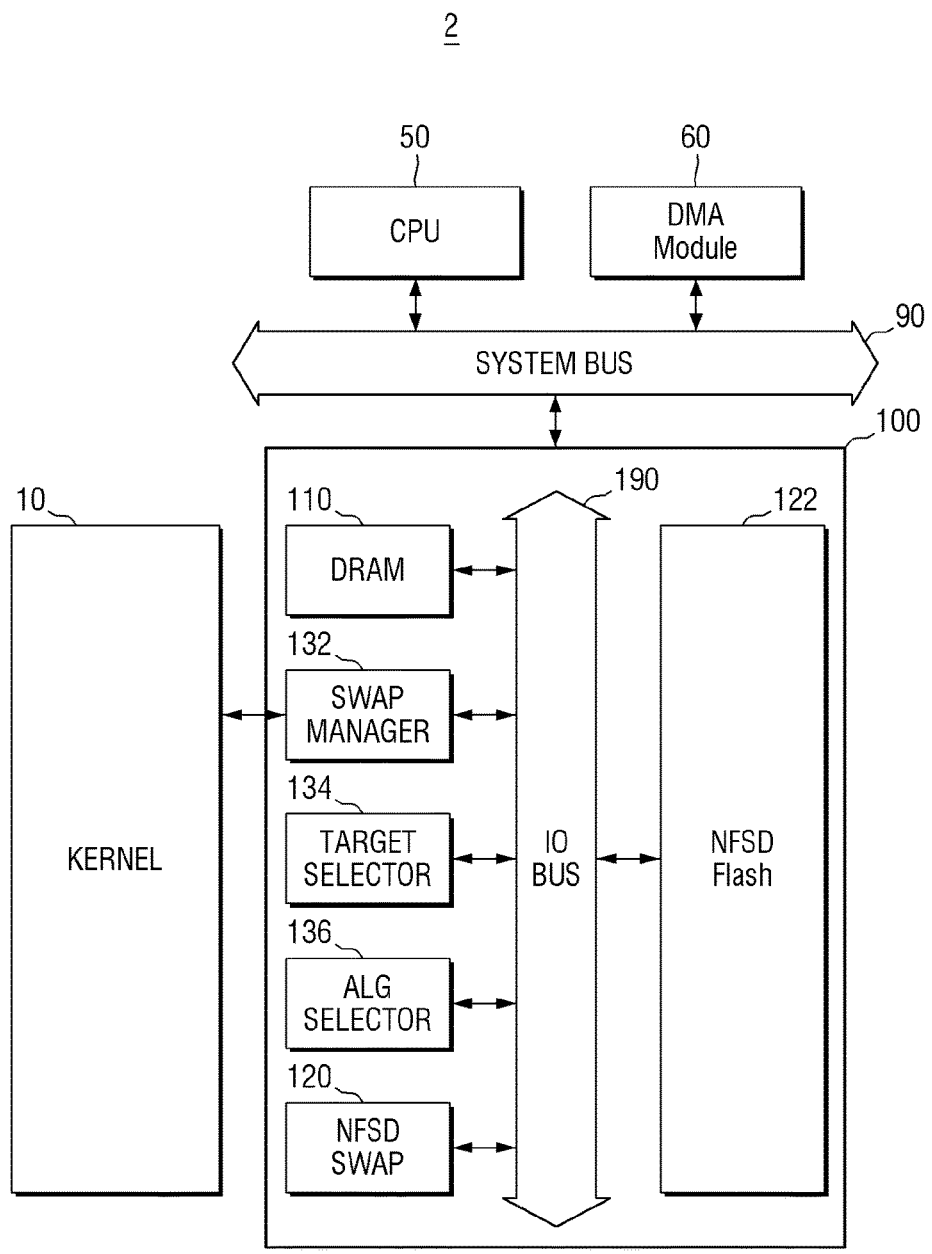
FIG. 5 is a block diagram illustrating a semiconductor system according to another embodiment of the present disclosure.

FIG. 5 is a block diagram illustrating a semiconductor system 2 according to another embodiment of the inventive concept.

Referring to FIG. 5, the semiconductor system 2 is different from the semiconductor system 1 of FIG. 1 in that the heterogeneous memory module 100 further includes a target selection module 134 and an algorithm selection module 136, where the target selection module 134 is used to select target data stored in one or more of the nonvolatile memory modules 120 and 122 according to an access pattern described by a page map.

In this regard, the algorithm selection module 136 may be used to select an algorithm from among a number of algorithms that most advantageously selects the target data under the control of the target selection module 134. The algorithm selection module 136 may receive one or more algorithms used to select target data. See, hereafter the description provided in relation to FIG. 6.

As will be described in some additional detail with respect to FIGS. 9 and 10, the algorithm selection module 136 may receive metadata including access pattern information associated with a page map, and provide one or more algorithms selected based on the access pattern to the target selection module 134.

By selecting the target data based on an access pattern of the page map, the performance of the swap manager 132 may be further improved. For example, based on a determined access pattern drawn for past or recently past data processing operations, "slow data" that is infrequently accessed be swapped out to a nonvolatile memory module 120, 122 while "fast data" that is frequently accessed may be retained in the volatile memory module 110. In this manner, it is possible to bias a data storage approach between volatile and nonvolatile memory modules based on access patterns, to further reduce data processing overhead.

Figure 6:
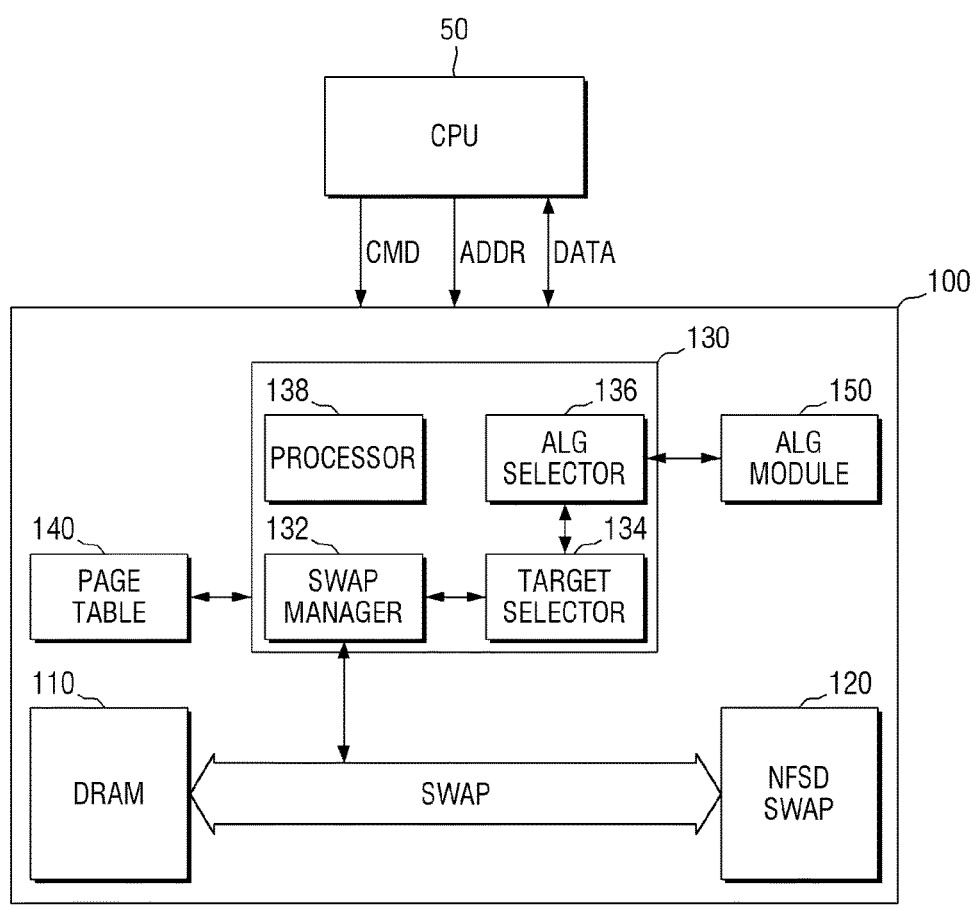
FIG. 6 is a block diagram explaining a semiconductor device constituting the semiconductor system of FIG. 5.

FIG. 6 is a block diagram illustrating a semiconductor system according to another embodiment of the inventive concept. Referring to FIG. 6, the semiconductor system is different from the semiconductor system of FIG. 2 in that the memory controller 130 further includes the target selection module 134 and algorithm selection module 136, as described above.

Here again, the algorithm providing module 150 may be used to provide an algorithm most efficiently allowing the target selection module 134 to select target data from the nonvolatile memory module 120 using the algorithm selection module 136. The algorithm may include various cache algorithms such as a least recently used (LRU) algorithm and a most recently used (MFU) algorithm.

The target selection module 134 may select target data to be swapped-in from the second type memory module 120 using the algorithm provided from the algorithm providing module 150. The swap manager 132 may perform a swap-in operation to transfer the target data selected by the target selection module 134 to the first type memory module 110.

Figure 7:
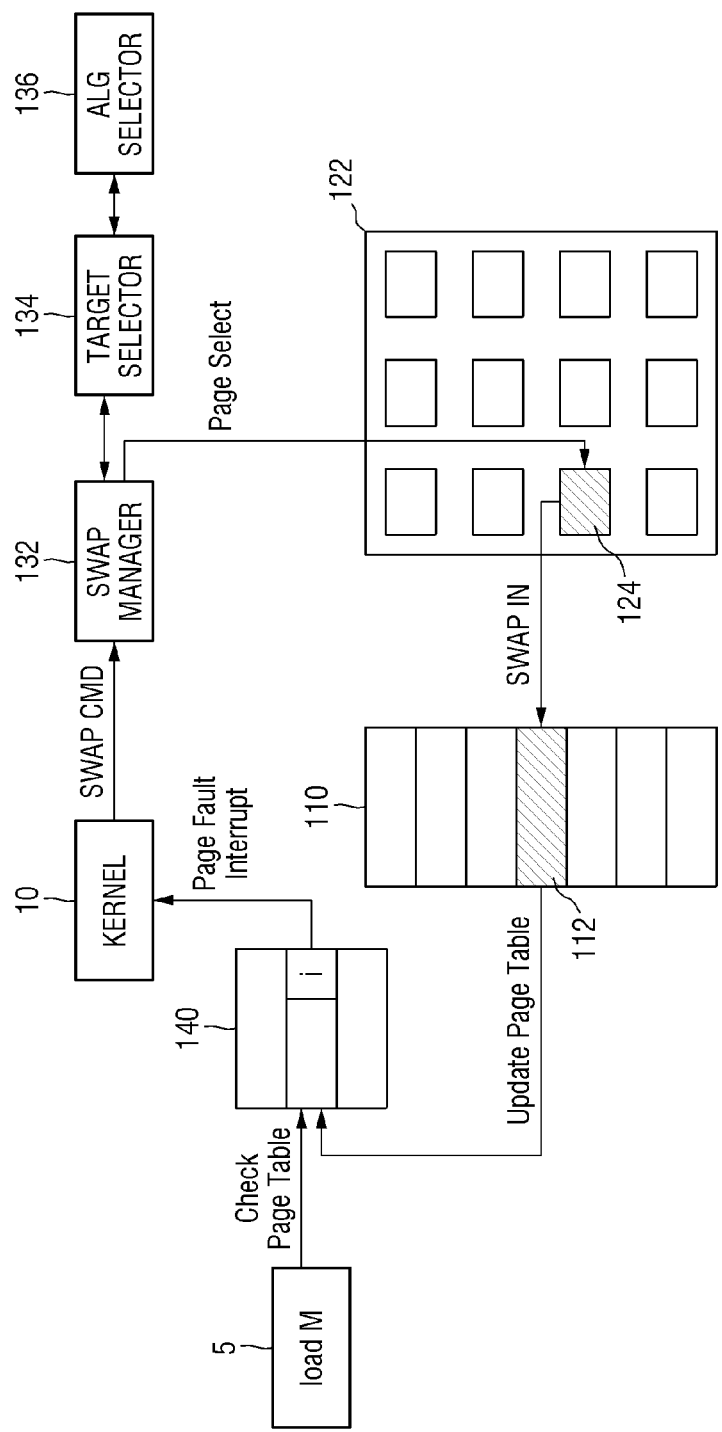
FIG. 7 is a diagram illustrating an embodiment of an operation of the semiconductor device of FIG. 6.

FIG. 7 is a conceptual diagram illustrating an operating approach to the embodiment of FIG. 6 and is similar to the approach described in relation to FIG. 3.

Here again, in response to the instruction 5 from CPU 50 including an address ADDR M and upon recognizing a page fault interrupt, the kernel 10 sends a swap command to the swap manager 132. The swap manager 132 performs a swap-in operation to transfer target data 124, which is selected according to an access pattern derived from a page map by the target selection module 134 and the algorithm selection module 136, to the volatile memory module 110, and thereafter updates the page table 140.

Thus, in addition to reducing the load on external resources during the data swap between the volatile memory module 110 and nonvolatile memory module 120, the selection of the swap target data based on the access pattern using the target selection module 134 and the algorithm selection module 136 enables further refinement of data processing operations.

Figure 8A:
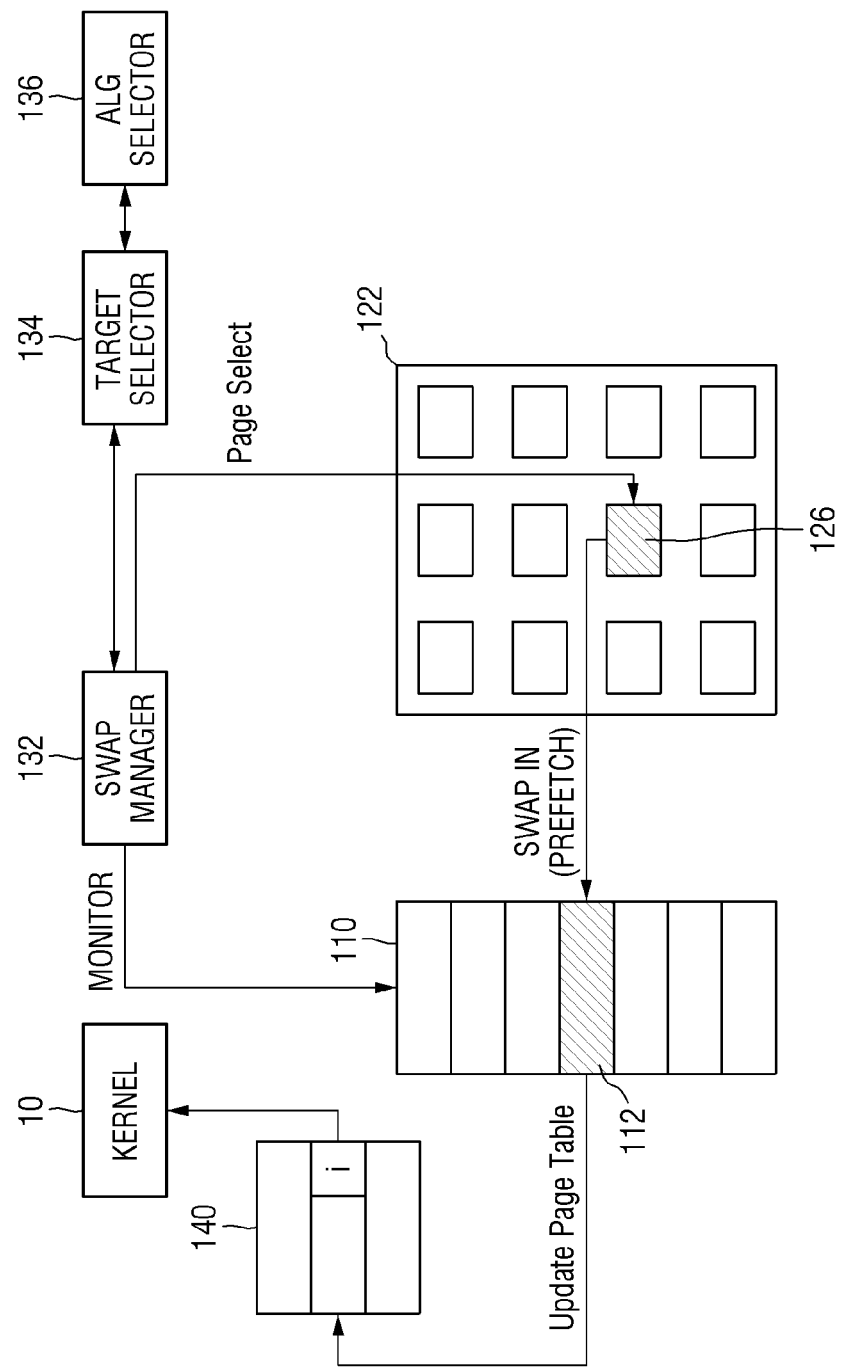
FIG. 8A is a diagram illustrating another embodiment of an operation of the semiconductor device of FIG. 6.
Figure 8B:
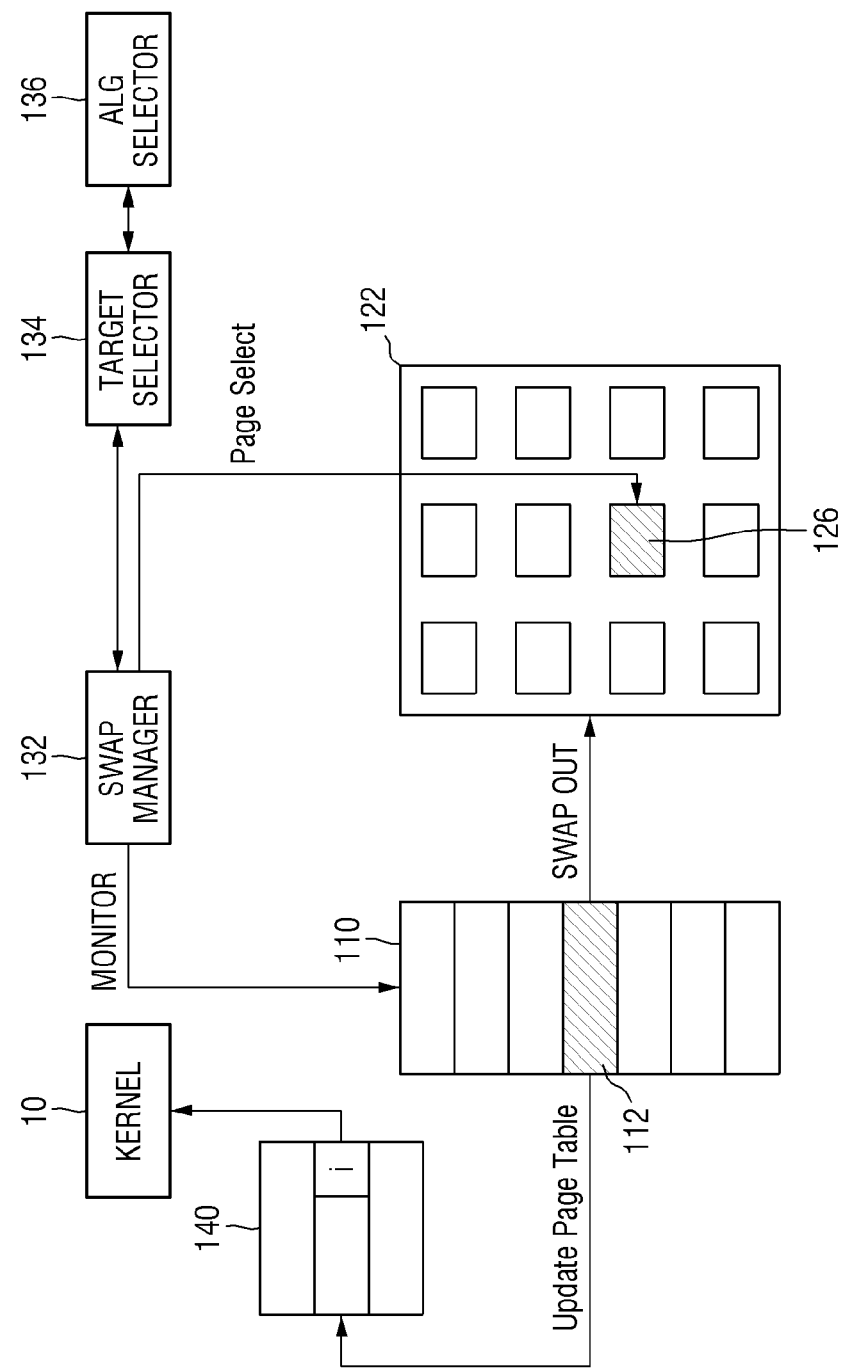
FIG. 8B is a diagram illustrating still another embodiment of an operation of the semiconductor device of FIG. 6.

In like manner, the operating approaches respectively illustrated in FIG. 8A and FIG. 8B further described the approaches illustrated in FIG. 4A and FIG. 4B with the additional capabilities provided by the target selector 134 and ALG selector 136 as described above.

Figure 9:
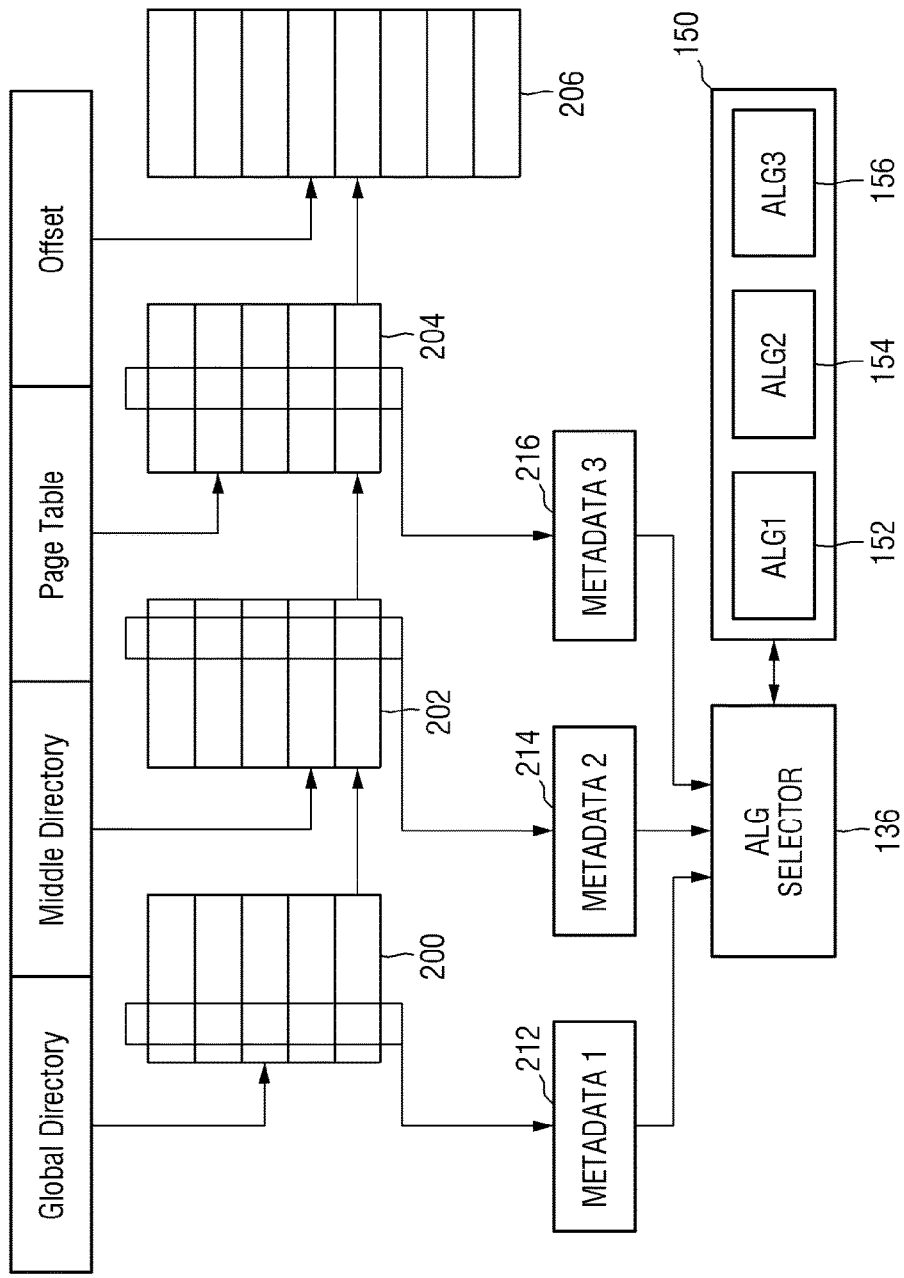
FIG. 9 is a diagram illustrating still another embodiment of an operation of the semiconductor device of FIG. 6.

FIG. 9 is a conceptual diagram illustrating an approach to the operation of the semiconductor system of FIG. 6.

Referring to FIG. 9, a page table of page map is assumed that includes a hierarchical structure of data defied according to a hierarchical page mapping policy. For example, the page map may have a hierarchical structure including a global directory 200, a middle directory 202, a page table 204 and an offset 206.

The algorithm selection module 136 may receive first metadata 212, second metadata 214 and third metadata 216 including the access pattern information of the page map, and select at least one of algorithms 152, 154 and 156 included in the algorithm providing module 150 using the access pattern information included in the metadata 212, 214 and 216.

In certain approaches, the length of the first metadata 212 may be longer than the length of the second metadata 214, and the length of the second metadata 214 may be longer than the length of the third metadata 214.

In this case, the first metadata 212 may be generated from the page map for the global directory 200 corresponding to a first layer of the page map. The second metadata 214 may be generated from the page map for the middle directory 202 corresponding to a second layer of the page map. The third metadata 216 may be generated from the page map for the page table 204 corresponding to a third layer of page map.

In particular, as shown in FIG. 9, the first metadata 212 may be generated from a portion of the page map for the global directory 200, the second metadata 214 may be generated from a portion of the page map for the middle directory 202, and the third metadata 216 may be generated from a portion of the page map for the page table 204.

Figure 10:
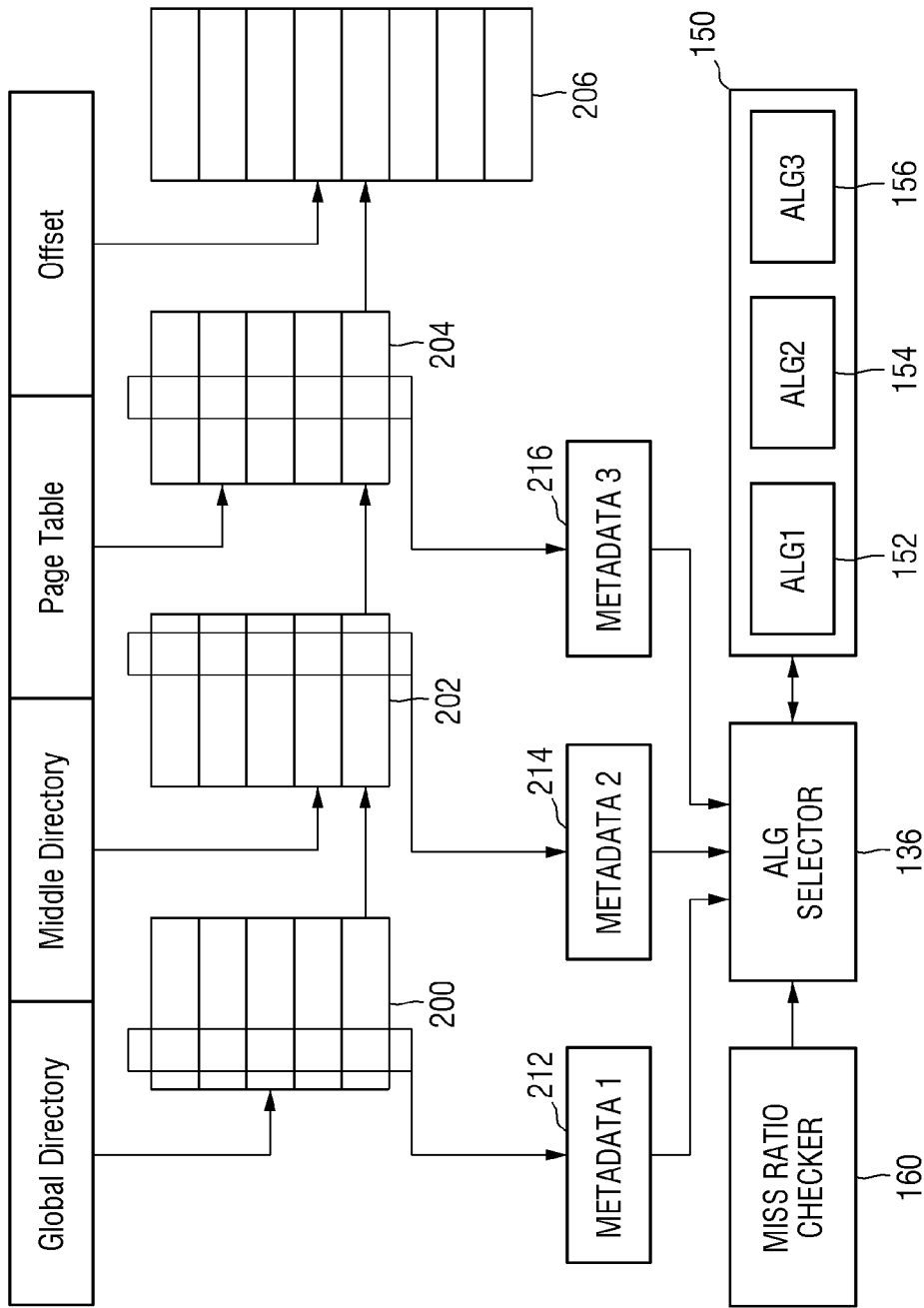
FIG. 10 is a diagram illustrating still another embodiment of an operation of the semiconductor device of FIG. 6.

FIG. 10 is another conceptual diagram illustrating another approach to the operation of the semiconductor system of FIG. 6.

Referring to FIG. 10, the algorithm selection module 136 may receive not only the first metadata 212, the second metadata 214 and the third metadata 216 including the access pattern information of the page map, but also information on a hit ratio for the first type memory module 110 from a hit rate providing module 160.

The algorithm selection module 136 may variably select one of the algorithms 152, 154 and 156 provided from the algorithm providing module 150 according to a change in the hit ratio for the first type memory module 110.

In certain approaches, since the swap manager 132 can perform swap between the first type memory module 110 and the second type memory module 120 without occupying the system bus 90, it is possible to not only ensure computing resources, but also reduce delay time overhead. Further, since the swap manager 132 operates automatically regardless of the control of the kernel 10, the data of the first type memory module 110 is managed frequently according to an appropriate swap policy, thereby achieving a performance improvement effect such as a reduction in the number of occurrences of page faults.

Furthermore, by selecting the swap target data based on the access pattern of the page map through the target selection module 134 and the algorithm selection module 136, the swap performance performed by the swap manager 132 can be improved.

Although certain embodiments of the inventive concept have been disclosed for illustrative purposes, those skilled in the art will appreciate that various modifications, additions and substitutions are possible, without departing from the scope of the inventive concept, as defined by the accompanying claims and their equivalents.

What is claimed is:

1. A semiconductor system, comprising:
   a central processing unit (CPU) connected to a heterogeneous memory module via a system bus, wherein the CPU is controlled by a kernel and configured to receive an external command identifying target data, search a page table for the target data, and return a page fault interrupt to the kernel upon unsuccessfully searching the page table, and
   the heterogeneous memory module comprises:
      a volatile memory module;
      a nonvolatile memory module;
      an internal bus separate from the system bus and connecting the volatile memory module and the nonvolatile memory module; and
      a swap manager configured to control execution of a swap operation in response to a swap command generated by the kernel in response to the page fault interrupt, wherein thereafter the swap operation is executed by the swap manager without intervention of the kernel to transfer the target data between the volatile memory module and nonvolatile memory module using the internal bus and without using the system bus.

2. The semiconductor system of claim 1, wherein the swap manager receives the swap command from the CPU via the external bus.

3. The semiconductor system of claim 2, wherein the kernel is disposed external to the heterogeneous memory module.

4. The semiconductor system of claim 1, wherein the swap manager is further configured to monitor data stored in the volatile memory module and generate a corresponding monitoring result, such that the swap manager is automatically configured to control the execution of the swap operation in response to the monitoring result.

5. The semiconductor system of claim 4,
wherein the swap manager is automatically configured to control the execution of the swap operation in response to the monitoring result and without regard to a control state for the kernel.

6. The semiconductor system of claim 5, wherein the page table describes data stored in the volatile memory.

7. The semiconductor system of claim 1, wherein the swap operation is one of a swap-in operation transferring data from the nonvolatile memory module to the volatile memory module.

8. The semiconductor system of claim 1, wherein the swap operation is a swap-out operation transferring data from the volatile memory module to the nonvolatile memory module.

9. The semiconductor system of claim 1, further comprising:
a direct memory access (DMA) module connected to the heterogeneous memory module via the external bus,
wherein the swap manager is configured to control execution of the swap operation transferring the target data between the volatile memory module and nonvolatile memory module without using the DMA module.

10. A semiconductor system, comprising:
a central processing unit (CPU) connected to a heterogeneous memory module via a system bus, wherein the CPU is controlled by a kernel and configured to receive an external command identifying target data, search a page table for the target data, and return a page fault interrupt to the kernel upon unsuccessfully searching the page table, and
the heterogeneous memory module comprises:
a volatile memory module wherein the page table describes the data stored in the volatile memory module;
a nonvolatile memory module;
an internal bus separate from the system bus and connecting the volatile memory module and the nonvolatile memory module; and
a memory controller,
wherein the memory controller comprises:
a target selector that selects target data stored in one of the volatile memory module and the nonvolatile memory module according to an access pattern derived from the page table;
an algorithm module that provides an algorithm; and
a swap manager configured in response to the algorithm to control execution of a swap operation in response to a swap command generated by the kernel in response to the page fault interrupt, wherein thereafter the swap operation is executed by the swap manager without intervention of the kernel to transfer the target data selected by the target selector between the volatile memory module and nonvolatile memory module using the internal bus and without using the system bus.

11. The semiconductor system of claim 10, wherein the swap manager receives the swap command from the CPU via the external bus.

12. The semiconductor system of claim 11, wherein the kernel is disposed external to the heterogeneous memory module.

13. The semiconductor system of claim 10, wherein the swap manager is further configured to monitor data stored in the volatile memory module and generate a corresponding monitoring result, such that the swap manager is automatically configured to control the execution of the swap operation in response to the monitoring result and the algorithm.

14. The semiconductor system of claim 13,
wherein the swap manager is automatically configured to control the execution of the swap operation in response to the monitoring result and without regard to a control state for the kernel.

15. The semiconductor system of claim 10, wherein the page map is a hierarchical structure of data defined according to a hierarchical page mapping policy.

16. The semiconductor system of claim 15, wherein the page map comprises a global directory, a middle directory, a page table and an offset, and
the algorithm module is an algorithm selection module that selects the algorithm from among a number of algorithms in response to metadata for the data stored in the volatile memory module.

17. The semiconductor system of claim 16, wherein the memory controller further comprises a hit rate module providing a hit ratio to the algorithm module, and
the algorithm selection module selects the algorithm from among the number of algorithms further in response to the hit ratio.

18. The semiconductor system of claim 10 further comprising:
a direct memory access (DMA) module connected to the heterogeneous memory module via the external bus,
wherein the swap manager is configured to control execution of the swap operation transferring the target data between the volatile memory module and nonvolatile memory module without using the DMA module.

19. A method of controlling the operation of a semiconductor system including a central processing unit (CPU) connected to a heterogeneous memory module via a system bus, wherein the heterogeneous memory module includes; a page table, a volatile memory module, a nonvolatile memory module, an internal bus separate from the system bus and connecting the volatile memory module and the nonvolatile memory module, and a swap manager, the method comprising:
receiving an external command identifying target data via the system bus;
searching a page table in response to the external command, and returning a page fault interrupt to a kernel upon unsuccessfully searching the page table;
generating a swap command in the kernel in response to the page fault interrupt; and
configuring the swap manager in response to the swap command to control the execution of a swap operation transferring target data between the volatile memory module and nonvolatile memory module using the internal bus and without intervention by the kernel and without using the system bus.

20. The method of claim 19, wherein the heterogeneous memory module further includes a memory controller including a target selector and an algorithm module, and the method further comprises:
  using the target selector to select the target data stored in one of the volatile memory module and the nonvolatile memory module according to an access pattern derived from the page table;
  providing an algorithm from the algorithm module; and
  controlling execution of the swap operation using the swap manager in response to the algorithm.

\* \* \* \* \*